BENJAMIN F. ROBBINS.
Improvement in Axle Shield for Carriages.
No. 119,281.                           Patented Sep. 26, 1871.
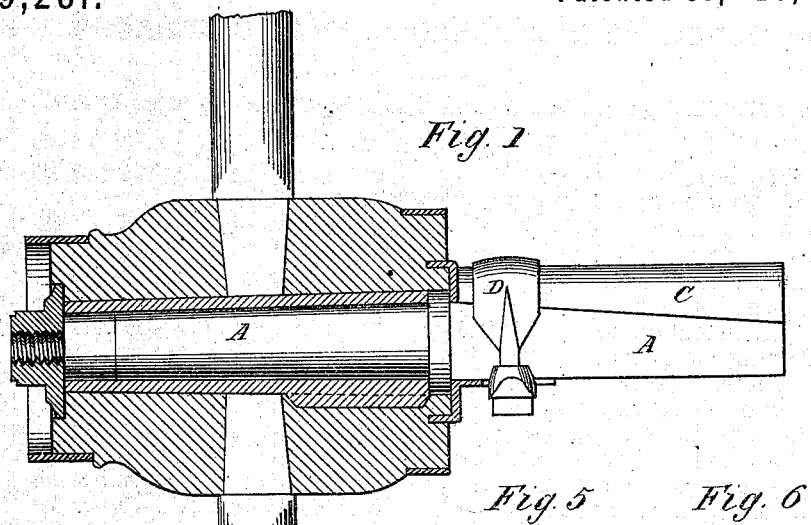
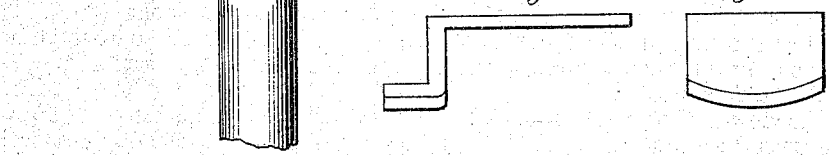
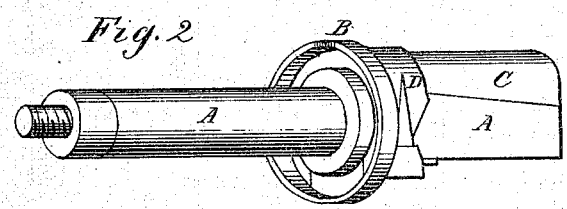
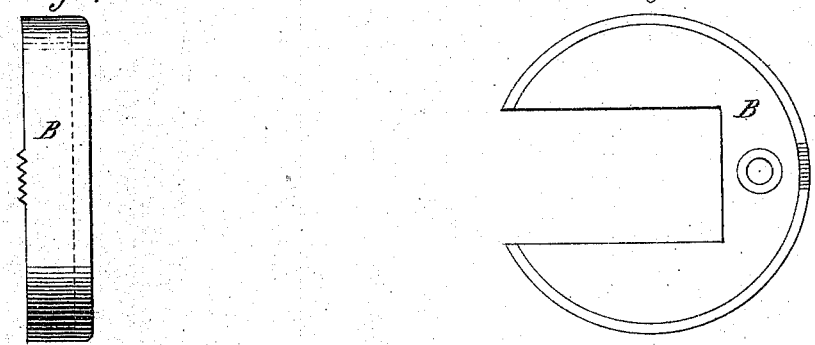
Witnesses
Alvah Robbins
Benjamin S Davis
Inventor
Benjamin F. Robbins 118,281

UNITED STATES PATENT OFFICE.

BENJAMIN F. ROBBINS, OF HARWICH, MASSACHUSETTS.

IMPROVEMENT IN AXLE-SHIELDS FOR CARRIAGES.

Specification forming part of Letters Patent No. 119,281, dated September 26, 1871.

*To all whom it may concern:*

Be it known that I, BENJAMIN F. ROBBINS, of Harwich, in the county of Barnstable and State of Massachusetts, have invented a certain Improvement in Carriage-Axle Screens, of which the following is a specification:

The first part of my invention relates to the flat circular plate having a large oblong slot from the rim to past the center of sufficient capacity to receive the axle into the center of the plate, and also having the edge turned up, forming a flange at right angles with the plate, upon which are teeth for the purpose of cutting its way into the end of the hub. This plate is fixed in a vertical position between the collar of the axle and axle-stock, receiving the axle into the slot, and is held there by the axle and a screw through the plate into the end of axle-stock.

Figure 1 is a side view of the wheel, axle, axle-stock, and fixings, with the hub and shield halved, showing the shield inserted into the hub as in working order. Fig. 2 is an oblique view of the axle without the wheel, showing the shield as it is fixed in its place between the collar of the axle and axle-stock. Fig. 3 is an elevation of the shield without the appendage, showing the slot for the axle and the hole for the screw. Fig. 4 is a bird's-eye view of the shield, showing the flange and teeth. Figs. 5 and 6 are the appendage to the shield, showing, in Fig. 6, that part which fills up the remainder of the slot unoccupied by the axle.

A A of Fig. 2 is the axle, with the shield B fitted to its place by receiving the axle into the open space, seen in Fig. 3, of the shield. As the space of the shield is slightly narrower than the axle it can be fitted as desired by filing. This, with the screw through the hole of the shield into the end of the axle-stock C, holds it tightly between the collar of the axle and axle-stock. The appendage, Fig. 5, is then placed under the axle, into the remainder of the slot unoccupied by the axle, and held there by the clip D. The whole thing is now held firmly up to the collar, and is now ready, as seen in Fig. 2, to receive the hub, which is made to revolve hard against the teeth of the flange until a groove is cut into the hub to the depth of the flange, as seen in Fig. 1. The entire circle of the groove is now filled by the flange, forming a complete protection of the box and axle against sand and other gritty substances.

I claim as my invention—

The combination of the shield, Fig. 3, with the appendage, Fig. 5, both forming the shield proper, substantially as and for the purpose hereinbefore set forth.

BENJAMIN F. ROBBINS.

Witnesses:
A. ROBBINS,
B. S. DAVIS.